(12) United States Patent
Ge et al.

(10) Patent No.: US 9,546,612 B2
(45) Date of Patent: Jan. 17, 2017

(54) CONTROL METHOD FOR AN ENGINE WITH EXHAUST GAS RECIRCULATION AND INTAKE VALVE ACTUATION

(71) Applicant: Caterpillar Inc., Peoria, IL (US)

(72) Inventors: Xinyu Ge, Peoria, IL (US); Kai Zhang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 308 days.

(21) Appl. No.: 14/295,815

(22) Filed: Jun. 4, 2014

(65) Prior Publication Data

US 2015/0354476 A1    Dec. 10, 2015

(51) Int. Cl.
| | | |
|---|---|---|
| *F01N 3/00* | (2006.01) | |
| *F01N 3/10* | (2006.01) | |
| *F02D 41/00* | (2006.01) | |
| *F01N 3/20* | (2006.01) | |
| *F02D 41/02* | (2006.01) | |

(52) U.S. Cl.
CPC ........... *F02D 41/0002* (2013.01); *F01N 3/208* (2013.01); *F02D 41/0055* (2013.01); *F01N 2900/08* (2013.01); *F01N 2900/1622* (2013.01); *F02D 41/028* (2013.01); *F02D 2041/001* (2013.01); *Y02T 10/18* (2013.01); *Y02T 10/24* (2013.01); *Y02T 10/42* (2013.01); *Y02T 10/47* (2013.01)

(58) Field of Classification Search
CPC .................... F01N 2900/08; F01N 2900/1622; F01N 3/208; F02D 2041/001; F02D 41/0002; F02D 41/0055; F02D 41/028

USPC ............................ 60/278, 285, 286, 301, 303
See application file for complete search history.

(56) References Cited

U.S. PATENT DOCUMENTS

| | | | |
|---|---|---|---|
| 4,485,794 A | 12/1984 | Kimberley et al. | |
| 5,419,301 A | 5/1995 | Schechter | |
| 5,743,243 A | 4/1998 | Yanagihara | |
| 6,701,903 B1 | 3/2004 | Collins et al. | |
| 6,722,121 B2 | 4/2004 | Gui et al. | |
| 6,772,742 B2 | 8/2004 | Lei et al. | |
| 8,505,278 B2 | 8/2013 | Farrell et al. | |
| 2007/0245714 A1* | 10/2007 | Frazier | F01N 3/208 60/276 |
| 2012/0022763 A1 | 1/2012 | Tonetti et al. | |
| 2013/0067894 A1 | 3/2013 | Stewart et al. | |
| 2013/0247564 A1 | 9/2013 | Nicholson et al. | |

* cited by examiner

*Primary Examiner* — Thomas Denion
*Assistant Examiner* — Diem Tran
(74) *Attorney, Agent, or Firm* — Baker & Hostetler LLP (57) ABSTRACT

A power system may include an internal combustion engine, an exhaust gas recirculation system, a selective catalytic reduction system, and an engine control module. The internal combustion engine includes a plurality of combustion cylinders and a plurality of corresponding intake valves for controlling a flow of air from an intake into the cylinders. The engine control module is configured to adjust a closure timing of the intake valves based on at least one engine parameter and optimization of an operational cost of the power system. A method for controlling the power system may include recirculating a portion of an exhaust flow, injecting a reductant into the exhaust flow, and adjusting a closure timing of the intake valves based on at least one engine parameter and optimization of an operational cost of the power system.

16 Claims, 6 Drawing Sheets

CONTROL METHOD FOR AN ENGINE WITH EXHAUST GAS RECIRCULATION AND INTAKE VALVE ACTUATION

TECHNICAL FIELD

This patent disclosure relates generally to diesel engines and, more particularly, to various aspects of control systems and methods for exhaust gas recirculation and intake valve actuation events in low emission diesel engines.

BACKGROUND

Internal combustion engines, including diesel engines, may produce regulated emissions, such as nitrogen oxides (NOx), and solid particulate matter which may also be referred to as soot or smoke. To control emissions, diesel engines may include a variety of specially calibrated systems such as Exhaust Gas Recirculation (EGR) systems, Selective Catalytic Reduction (SCR) systems, Diesel Particulate Filter (DPF) systems, and combinations thereof. An engine control module (ECM) is often used to calibrate and control these emission control systems, as well as a large variety of engine control parameters, in a carefully balanced approach that weighs fuel efficiency against the regulation of emissions.

U.S. Pat. No. 7,861,518 describes an engine controller that considers the cost of operating a combustion engine and the cost of operating an SCR system in establishing the parameters by which the diesel engine will operate. Cost-efficiency of the system is determined by controlling engine parameters, including cooled EGR airflow, fuel injection timing, fuel injection pressure, and air-to-fuel ratio, as well as the volume of reductant used in the SCR system. However, the control of air intake valve timing is not considered.

Intake Valve Actuation (IVA) may be used in internal combustion engines to, for example, increase fuel efficiency. By controlling the closure timing of the intake valves, for example, the volumetric efficiency of a diesel engine may be adjusted. One of the advantages of this adjustment is achievement of better indicated thermal efficiency at part loads while IVA maintains relatively low peak cylinder pressure at high loads. Peak cylinder pressure directly impacts combustion temperature in cylinders, and hence impacts the engine out brake-specific NOx (BSNOx) emission. Because tailpipe BSNOx is determined by engine out BSNOx and SCR conversion performance, IVA may have a direct impact on the use of a reductant, or Diesel Emission Fluid (DEF) in the SCR system. In addition, IVA has a direct impact on the exhaust recirculation flow of the EGR system due to the IVA influence on the intake manifold pressure. Conventional IVA control performs tasks according to a set logic as predetermined by engine calibration maps, although the price of diesel fuel and reductant, or Diesel Emission Fluid (DEF), may change or vary across different regions and in different seasons.

The present disclosure is directed to address one or more of the issues set forth above with respect to conventional diesel engines, in addition to other problems in the art.

SUMMARY

According to an aspect of the disclosure, a system for adaptively controlling intake valve actuation includes an internal combustion engine having a plurality of combustion cylinders and a plurality of corresponding intake valves for controlling a flow of air into the cylinders, an exhaust gas recirculation system configured to recirculate a portion of an exhaust gas flow exiting the cylinders back into the flow of air entering the cylinders, a selective catalytic reduction system configured to inject a reductant into the exhaust gas flow, a variable valve actuation system having a plurality of valve actuators for variably controlling the closure timing of the intake valves, and an engine control module configured to adjust a closure timing of the intake valves based on at least one engine parameter and optimization of an operational cost of the system.

In accordance with another aspect of the disclosure, a method of controlling a power system includes providing an internal combustion engine configured to generate power through combustion of a fuel, recirculating a portion of an exhaust flow from the engine with an exhaust gas recirculation system, injecting a reductant into the exhaust flow in a selective catalytic reduction system, adjusting a closure timing of the intake valves on the engine based on at least one engine parameter and optimization of an operational cost of the power system.

In accordance with yet another aspect of the present disclosure, a non-transitory computer usable storage medium having computer readable program code thereon for controlling a power system may include computer readable program code for determining a rate of recirculation of an exhaust flow from the internal combustion engine to the intake, computer readable program code for controlling an exhaust gas recirculation system to direct a portion of the exhaust flow to the intake based on the rate of recirculation, computer readable program code for determining an amount of a reductant to inject into the exhaust flow based on a desired NOx emission level, computer readable program code for controlling a selective catalytic reduction system to inject the amount of reductant into the exhaust flow, and computer readable program code for adjusting a closure timing of the intake valves based on at least one engine parameter and optimization of an operational cost of the power.

DETAILED DESCRIPTION

The disclosure will now be described with reference to the drawing figures, in which like reference numerals refer to like parts throughout, unless specified otherwise.

Various aspects of a diesel engine and/or associated systems may be illustrated by describing components that are connected, attached, and/or joined together. As used herein, the terms "connected," "attached," and/or "joined" are used to indicate either a direct connection between two components or, where appropriate, an indirect connection to one another through intervening or intermediate components. In contrast, if a component is referred to as being "directly coupled," "directly attached," and/or "directly joined" to another component, there are no intervening elements present.

Embodiments of the disclosure advantageously provide systems and methods for selecting discrete IVA and EGR operating modes based on an operating condition; and evaluating tradeoffs between in-cylinder and after-treatment emissions control strategies to minimize total cost of engine operation while accommodating prevailing emissions standards of the territory of operation. For example, an adaptive coupled EGR and IVA controller may be provided to variably adjust intake valve closure timing and control the exhaust recirculation rate to 1) optimize the indicated thermal efficiency for an engine operation region by adaptively adjusting volumetric efficiency according to a predetermined set of criteria; 2) minimize total operation cost by taking into consideration the operational load of the engine and/or other operating conditions of the engine; and 3) actively monitor the SCR conversion efficiency and pressure differential information across the DPF in order to control exhaust temperature whenever a regeneration event or desulphation event is triggered.

Figure 1:
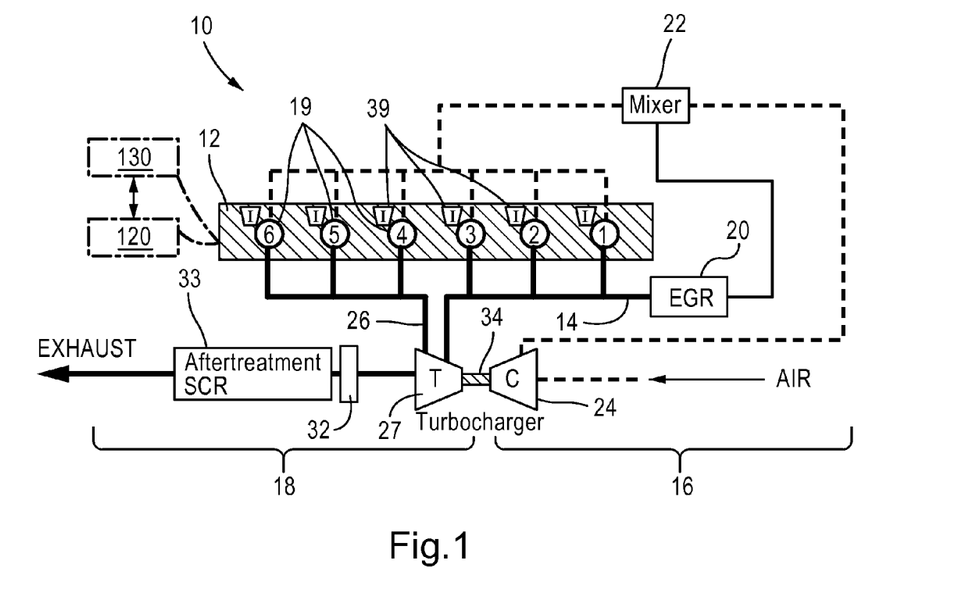
FIG. 1 is a schematic of a power system, in accordance with aspects of the present disclosure.

Referring to the drawings, specifically FIG. 1, for the purposes of this disclosure power system 10 is depicted and described as a compression ignition, internal combustion engine. However, it is contemplated that power system 10 may embody any other type of internal combustion engine, such as, for example, a spark, laser, or plasma ignition engine. The power system 10 may be fueled by distillate diesel fuel, biodiesel, dimethyl ether, gaseous fuels, such as hydrogen, natural gas, and propane, alcohol, combinations thereof, or any other combustion fuel known in the art.

Power system 10 may include an engine block 12 at least partially defining a plurality of cylinders 19, and a plurality of piston assemblies (see FIG. 3) disposed within the cylinders 19 to form combustion chambers. It is contemplated that power system 10 may include any number of combustion chambers and that the combustion chambers may be disposed in an "in-line" configuration, a "V" configuration, or in any other conventional configuration.

Multiple separate sub-systems may be included within power system 10. For example, power system 10 may include an air intake or air induction system 16, an exhaust system 18, and an EGR system 20. Air induction system 16 may be configured to direct air, or an air and fuel mixture of air and another gas, such as exhaust gas, into power system 10 for subsequent combustion. Exhaust system 18 may exhaust byproducts of the combustion to the atmosphere. A recirculation loop of the EGR system 20 may be configured to direct a portion of the exhaust gases from exhaust system 18 back into the air induction system 16 for subsequent combustion.

Air induction system 16 may include multiple components that cooperate to condition and introduce compressed air into cylinders 19. For example, air induction system 16 may include a mixer 22, or intake manifold, located downstream of one or more compressors 24 that feeds variable valve actuators 39 associated with each cylinder 19. It is contemplated that air induction system 16 may include different or additional components than described above such as, for example, a throttle valve, air coolers, filtering components, compressor bypass components, and other known components, if desired. It is further contemplated that compressor 24 may be omitted, if a naturally aspirated engine is desired.

Exhaust system 18 may include multiple components that condition and direct exhaust from cylinders 19 to the atmosphere. For example, exhaust system 18 may include an exhaust passageway 26, one or more turbines 27 driven by the exhaust flowing through passageway 26, a particulate collection device 32 such as a diesel particulate filter (DPF) located downstream of turbine 27, and an exhaust aftertreatment device 33 fluidly connected downstream of particulate collection device 32. It is contemplated that exhaust system 18 may include different or additional components than described above such as, for example, bypass components, an exhaust compression or restriction brake, an attenuation device, additional exhaust treatment devices, and other known components, if desired.

Turbine 27 may be located to receive exhaust leaving power system 10, and may be connected to one or more compressors 24 of air induction system 16 by way of a common shaft 34 to form a turbocharger. As the hot exhaust gases exiting power system 10 flow through turbine 27 and expand against vanes (not shown) thereof, turbine 27 may rotate and drive the connected compressor 24 to pressurize inlet air.

Particulate collection device 32 may be a DPF located downstream of turbine 27 to remove particulate matter from the exhaust flow of power system 10. It is contemplated that DPF 32 may include an electrically conductive or nonconductive coarse mesh metal or porous ceramic honeycomb medium. As the exhaust flows through the medium, particulates may be blocked by and trapped in the medium. Over time, the particulates may build up within the medium and, if unaccounted for, could affect engine performance by increasing exhaust backpressure.

To minimize backpressure effects on engine performance, the collected particulates may be passively and/or actively removed through a process called regeneration. When passively regenerated, the particulates deposited on the filtering medium may chemically react with a catalyst, for example, a base metal oxide, a molten salt, and/or a precious metal that is coated on or otherwise included within DPF 32 to lower the ignition temperature of the particulates. Because DPF 32 may be closely located downstream of engine block 12 (e.g., immediately downstream of turbine 27, in one example), the temperatures of the exhaust flow entering DPF may be controlled to be high enough, in combination with the catalyst, to burn away the trapped particulates. When actively regenerated, heat is applied to the particulates deposited on the filtering medium to elevate the temperature thereof to an ignition threshold. In accordance with yet other aspects of the present disclosure, an active regeneration device (not shown), such as a fuel-fired burner or an electric heater, may be located proximal (e.g., upstream of) DPF to assist in controlling the regeneration of the DPF. A combination of passive and active regeneration may be utilized, if desired.

Exhaust aftertreatment device 33 may receive exhaust from turbine 27 and trap or convert particular constituents in the gas stream. In one example, exhaust aftertreatment device 33 may embody a selective catalytic reduction (SCR) device having a catalyst substrate located downstream from a reductant injector. A gaseous or liquid reductant, most commonly urea or a water/urea mixture may be sprayed or otherwise advanced into the exhaust upstream of catalyst substrate by a reductant injector. As the reductant is absorbed onto the surface of catalyst substrate, the reductant may react with NOx (NO and $NO_2$) in the exhaust gas to form water ($H_2O$) and elemental nitrogen ($N_2$). In some embodiments, a hydrolysis catalyst may be associated with catalyst substrate to promote even distribution and conversion of urea to ammonia ($NH_3$).

In accordance with other aspects of the present disclosure, the reduction process may also include an oxidation catalyst, which, for example, may include a porous ceramic honeycomb structure or a metal mesh substrate coated with a material, for example a precious metal, that catalyzes a chemical reaction to alter the composition of the exhaust. For example, the oxidation catalyst may include platinum that facilitates the conversion of NO to $NO_2$, and/or vanadium that suppresses the conversion.

The exhaust aftertreatment device 33 may require desulphation to maintain an acceptable NOx conversion rate. Similar to a regeneration event of the particulate collection device 30, the desulphation event may require increased exhaust temperatures. Decoupling the IVA control from the EGR control during desulphation, for example, provides enhanced capability for thermal management of the exhaust during such maintenance events.

EGR system 20 may redirect gases from exhaust system 18 back into air induction system 16 for subsequent combustion. EGR is a process whereby exhaust gas from the engine is recirculated back into the engine air intake system for subsequent combustion. The recirculated exhaust gases may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of NOx. A cooler may be included to cool the exhaust gases before they are combusted.

When utilizing EGR in a turbocharged diesel engine, as shown in FIG. 1, the exhaust gas to be recirculated may be removed upstream of the exhaust gas driven turbine 27 associated with the turbocharger. For example, in many EGR applications the exhaust gas may be diverted directly from the exhaust manifold and diverted via an EGR conduit 21 to the air induction system 16. Likewise, the recirculated exhaust gas may be re-introduced to the air induction system 16 downstream of the compressor 24. The EGR system may be an external EGR system and may include various features for implementation of the methods described herein, such as a system of primary control and bypass valves to allow an engine control module (ECM) 120 to control various flows through the EGR system during selected engine operating conditions.

The ECM 120 in accordance with the present disclosure couples control of the conventionally uncoupled systems in order to provide adaptive engine control taking into consideration the engine operating conditions, the overall cost parameters of the engine, and pertinent emission standards. Further, ECM 120 may implement various sensors and control features by using computer software, hardware, or a combination of software and hardware. For example, ECM 120 may execute software programs to generate the values of sensing parameters (e.g., NOx emission level) based on a computational model and other parameters.

In operation, computer software instructions may be stored in or loaded to ECM 120. ECM 120 may execute the computer software instructions to perform various control functions and processes to control power system 10 and to automatically adjust engine operational parameters, such as fuel injection timing and fuel injection pressure, etc. In particular, ECM 120 may execute computer software instructions to generate data and/or control aspects of the IVA, EGR, and SCR systems. ECM 120 may include any appropriate type of engine control system configured to perform engine control functions such that power system 10 may operate properly. Further, ECM 120 may also control other systems of a vehicle, such as transmission systems, and/or hydraulics systems, etc.

Figure 2:
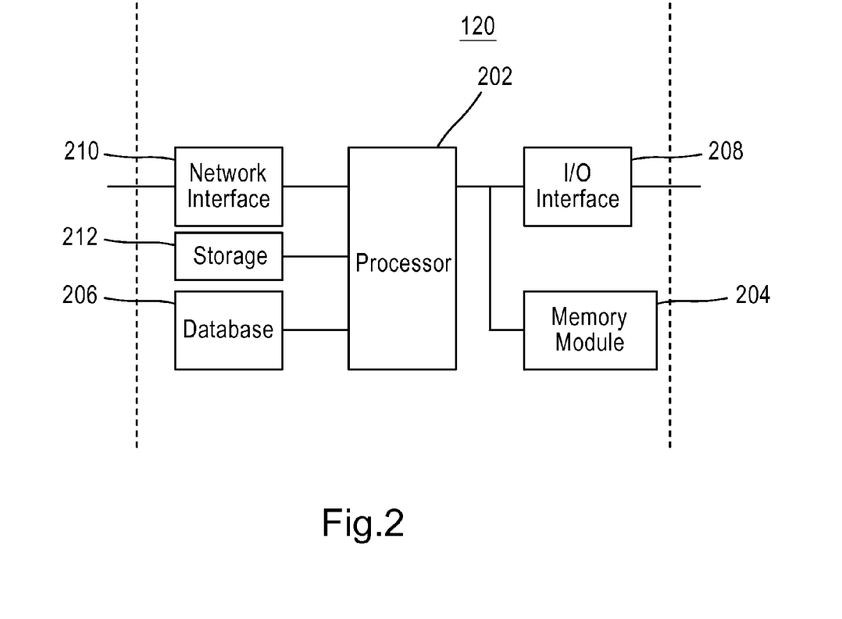
FIG. 2 is a block diagram of an exemplary engine control module, in accordance with aspects of the present disclosure.

FIG. 2 shows an exemplary functional block diagram of ECM 120. As shown in FIG. 2, ECM 120 may include a processor 202, a memory module 204, a database 206, an I/O interface 208, a network interface 210, and a storage 212. Other components or devices, however, may also be included in ECM 120. Further, the listed devices and other devices may be implemented in hardware, such as field programmable gate array (FPGA) devices, etc., computer software, or a combination of hardware and software. Certain FPGA devices may be reconfigured to selectively support functions provided by the listed devices.

Processor 202 may include any appropriate type of general purpose microprocessor, digital signal processor, or microcontroller. Memory module 204 may include one or more memory devices including, but not limited to, a ROM, a flash memory, a dynamic RAM, and/or a static RAM. Memory module 204 may be configured to store information used by processor 202. More than one memory module may be included.

Database 206 may include any type of appropriate database containing information on engine parameters, operation conditions, mathematical models, and/or any other control information. Further, I/O interface 208 may include any appropriate type of device or devices provided to couple processor 202 to various physical sensors or other components (not shown) within the power system 10 or within a vehicle in which the power system 10 is housed.

Information may be exchanged between external devices or components, such as power system 10 or the various physical sensors, etc., and processor 202. A user or users of a vehicle housing the power system 10 may also exchange information with processor 202 through I/O interface 208. The users may input data to processor 202, and processor 202 may output data to the users, such as warning or status messages. Further, I/O interface 208 may also be used to obtain data from other components (e.g., the physical sensors, etc.) and/or to transmit data to these components from ECM 120.

Network interface 210 may include any appropriate type of network device capable of communicating with other computer systems based on one or more communication protocols. Network interface 210 may communicate with other computer systems within the vehicle or outside the vehicle via certain communication media such as control area network (CAN), local area network (LAN), and/or wireless communication networks.

Storage 212 may include any appropriate type of mass storage provided to store any type of information that processor 202 may need to operate. For example, storage 212 may include one or more floppy disk devices, hard disk devices, optical disk devices, or other storage devices to provide storage space.

Returning to FIG. 1, ECM 120 may include a sensor system 130 for providing various parameters used in engine control functions. Sensor system 130 may include physical sensors and/or any appropriate type of control system that generates values of sensing parameters based on a computational model and a plurality of measured parameters. As used herein, the sensing parameters may refer to those measurement parameters that are directly measured by a particular physical sensor. For example, a physical NOx emission sensor may measure the NOx emission level and provide values of NOx emission level, the sensing parameter, to ECM 120. The sensor system 130 may include a virtual sensor to predict or derive a sensing parameter such that a corresponding physical sensor may be omitted. Sensing parameters may also include any output parameters that may be measured indirectly by physical sensors and/or calculated based on readings of physical sensors. The measured parameters, as used herein, may refer to any parameters relevant to the sensing parameters and indicative of the state of the power system 10. For example, for the sensing parameter NOx emission level, measured parameters may include machine and environmental parameters, such as compression ratios, turbocharger efficiency, after cooler characteristics, temperature values, pressure values, ambient conditions, fuel rates, and engine speeds, etc. Measured parameters may often be included in inputs to be provided to a virtual sensor.

Although the sensor system 130, as shown in FIG. 1, is configured to coincide with ECM 120, the sensor system 130 may also be configured as a separate control system or as a part of other control systems. Further, ECM 120 may implement the sensor system 130 by using computer software, hardware, or a combination of software and hardware. For example, ECM 120 may execute software programs to generate the values of sensing parameters (e.g., NOx emission level) based on a computational model and other parameters.

In operation, computer software instructions may be stored in or loaded to ECM 120. ECM 120 may execute the computer software instructions to perform various control functions and processes to control power system 10 and to automatically adjust engine operational parameters, such as fuel injection timing and fuel injection pressure, etc. In particular, ECM 120 may execute computer software instructions to generate and/or operate the sensor system 130 to provide engine emission values and other parameter values used to control power system 10, such as levels of nitrogen oxides (NOx), sulfur dioxide (SO2), carbon monoxide (CO), total reduced sulfur (TRS), particulates, and/or hydrocarbon (HC), etc. In particular, NOx emission levels, particulate emission levels, and HC emission levels may be important to normal operation of power system 10 and/or to meet certain emissions regulations. NOx emission level, particulate matter emission level, and HC emission level may be referred to as regulated emission levels. Other emission levels, however, may also be included.

The ECM 120 may also collect and/or determine control parameters that are associated with conditions corresponding to the operations of power system 10, such as engine speed, fuel rate, injection timing, intake manifold temperature (IMAT), intake manifold pressure (IMAP), intake valve actuation (IVA) end of current, IVA timing, injection pressure, etc. The control parameters may be measured by certain physical sensors, such as a high precision lab grade physical sensor, or created by other control systems. Other parameters, however, may also be included. For example, control parameters may also include some or all of total fuel injection quantity, oxygen/fuel molar ratio, atmospheric pressure, total induction mass flow, etc.

Figure 3:
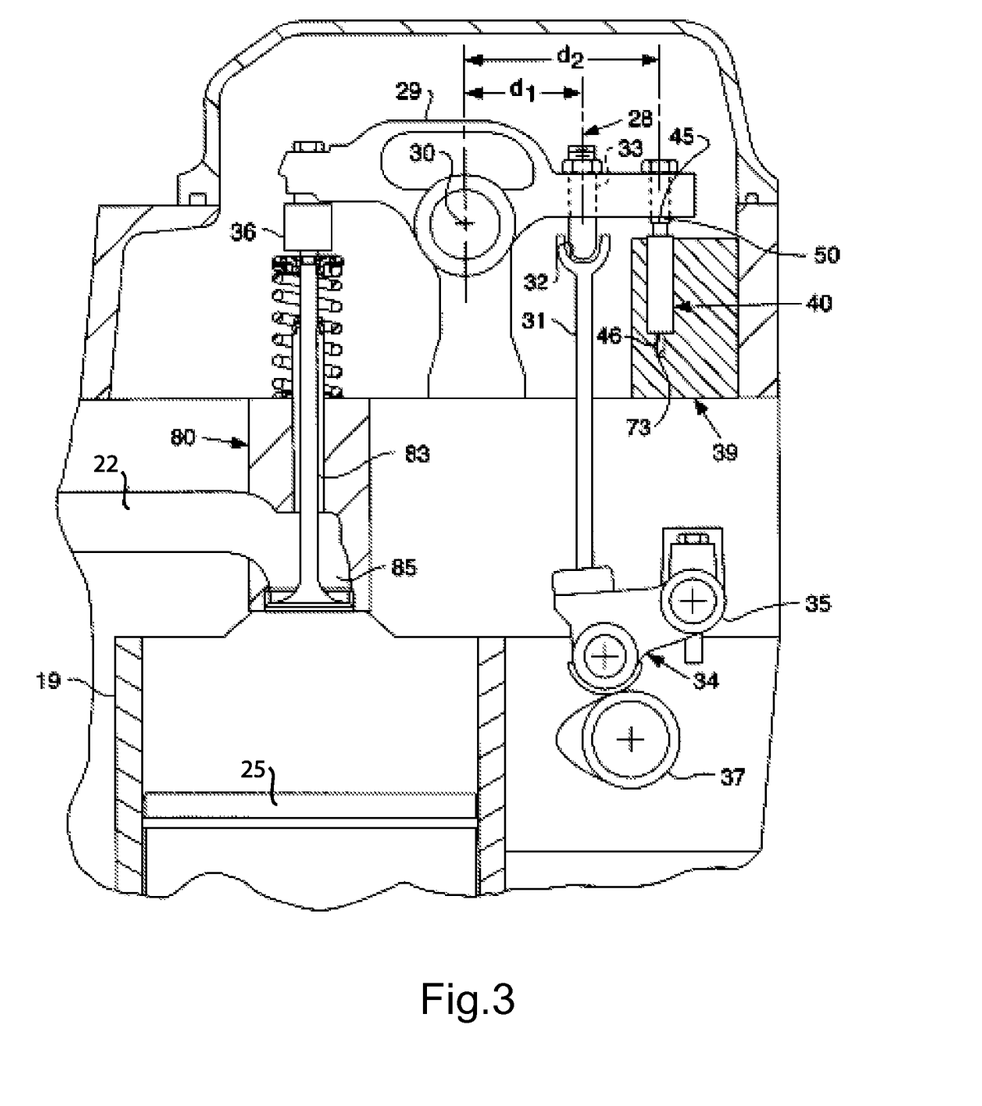
FIG. 3 is a sectioned front diagrammatic view of a cylinder shown as part of the power system of FIG. 1, in accordance with aspects of the present disclosure.
Figure 4:
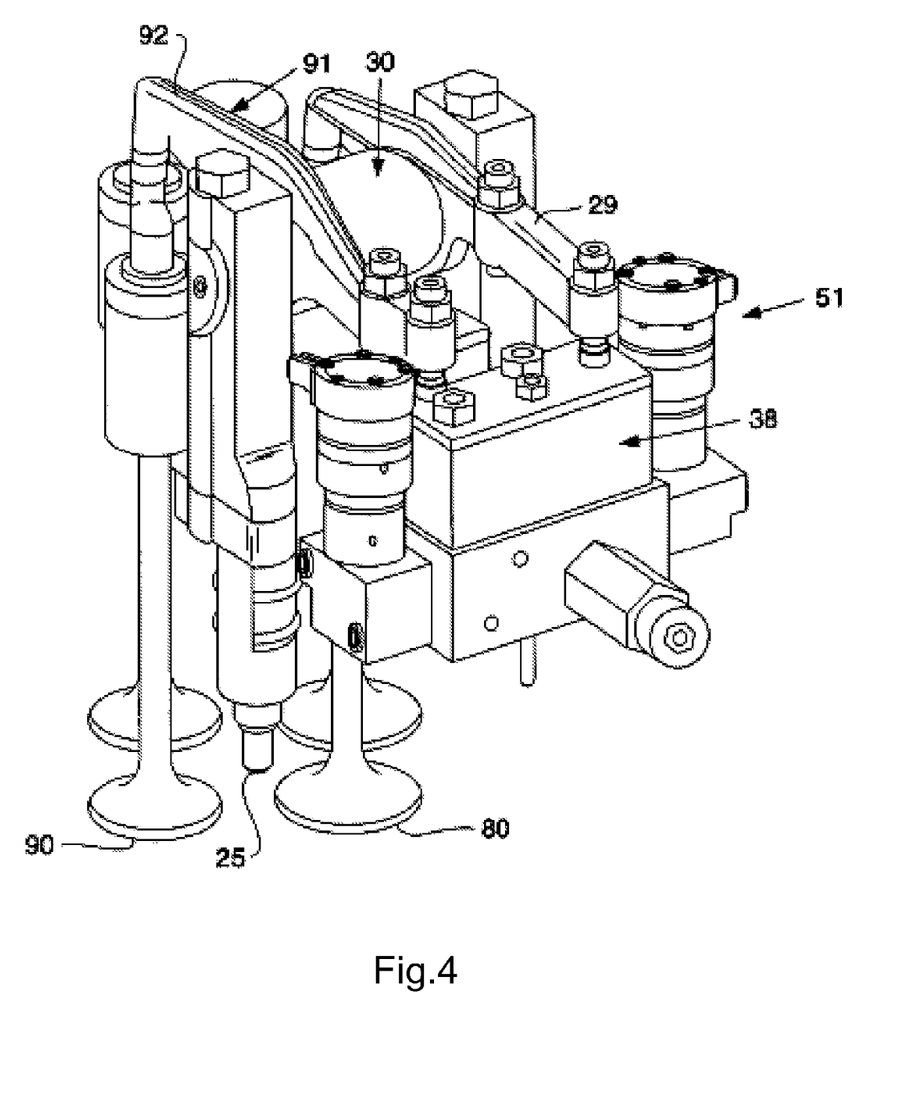
FIG. 4 is a diagrammatic isometric view of a valve assembly that may be used in the power system of FIG. 1, in accordance with aspects of the present disclosure.

The IVA system comprises the individual intake valve actuators 39, as shown in FIG. 1, wherein each variable intake valve actuator 39 has the ability to selectively place the mixer 22 in fluid communication with the combustion chamber of each respective cylinder 19 by allowing the intake valve to be placed in the open position to receive the air mixture. Referring in addition to FIGS. 3 and 4, each cylinder 19 provides a number of gas exchange valves, preferably including two intake valves 80 and two exhaust valves 90 (FIG. 4). A cam 37 may be provided which is positioned to mechanically engage intake valves 80, preferably via a rocker arm assembly 28. As cam 37 rotates, a lifter assembly 34 may be moved upward about lifter group shaft 35. Lifter assembly 34 may act upon rocker arm assembly 28, which includes a rocker arm 29 mounted to pivot about pivot 30 corresponding to rotating movement of cam 37 via a connector rod 31. Thus, cam 37 can mechanically engage an intake valve member 83 movably positioned within each intake valve 80 via rocker arm assembly 28. In addition, a bridge 36 may be provided which allows single rocker arm 29 to be mechanically coupled to the intake valve members 83 of two intake valves 80. With each intake stroke of piston 25, intake valve member 83 may be driven downward to open cylinder 19 to the intake manifold via an intake passage 85 defined by the cylinder head design.

In a similar manner, additional cam lobes (not shown) are provided by power system 10 that can mechanically engage exhaust valves 90, preferably via an exhaust valve rocker assembly 91. Rotation of this exhaust cam can cause an exhaust valve rocker arm 92 to move in a corresponding manner to either open or close exhaust valve 90. Thus, with each exhaust stroke of piston 25, a connection rod (not shown) is driven upward to open cylinder 19 to an exhaust manifold (not shown) via rocker arm 92. However, while rocker arm assembly 28 and rocker arm assembly 91 have been illustrated as the mechanical linkage between intake valves 80 and exhaust valves 90 and their respective cams, it should be appreciated that other linkages could be substituted. For instance, one or both of cam 37 and the exhaust cam could instead be an overhead cam that mechanically engages the respective gas exchange valve via an alternative linkage. In addition, cam 37 and the electro-hydraulic assist actuator could engage rocker arm 29 on opposite sides of pivot 30.

Returning to power system 10 shown in FIGS. 3 and 4, while intake valves 80 and exhaust valves 90 are cam actuated, they can be mechanically engaged by the electro-hydraulic intake actuators 39, for example, and exhaust actuators (not shown), respectively, provided by a valve assembly 38. As illustrated in FIG. 3, the intake actuator 39 may be preferably a second distance $d_2$ from pivot 30, which is greater than a first distance $d_1$ between pivot 30 and cam 37. In accordance with aspects of the present disclosure, the intake actuator 39 may be hydraulically controlled such that a flow control valve (not shown) controls flow of hydraulic fluid into an intake plunger control passage 73 to act against a plunger 40. When the intake actuator 39 is actuated, the plunger 40 may be forced to engage the rocker arm 29 via an adjustment screw 50 in a manner that opens or closes the valve member 83 of intake valve 80. Thus, when the intake valve actuators 39 are used to place the intake valves 80 in the closed position, air is prevented from advancing from the intake manifold to the combustion chamber of the cylinders 19 since the intake valve blocks fluid flow through the intake port.

The intake actuators 39 may be used to alter the timing of the intake valves 80 and/or exhaust valves 90 opening and closing to adjust ignition timing and/or combustion duration within cylinder 19. For instance, electronic control module 120 may retard the timing of the ignition event by reducing the compression ratio within cylinder 19 utilizing the variable valve timing of the present disclosure. The intake actuator 39 may be activated just prior to, or during, the compression stroke of piston 25, such that intake valve 80 will be opened, or remain open, for a portion of the compression stroke. By opening intake valve 80 during the compression stroke, the compression ratio will be lowered in cylinder 19 due to a delay in the start of compression. This reduced compression ratio will result in a later, or retarded, start of ignition. Once again, intake valve 80 need not be held to its fully open position during the compression stroke. Instead, intake valve 80 could only be opened slightly, so long as the compression ratio within cylinder 19 is sufficiently reduced.

The power system 10 may further include temperature sensors as part of the sensor system (130). For example, a temperature sensor may be secured to the engine block 12 proximate to the combustion chamber of each cylinder to measure temperature associated with the power system 10 and/or the temperature of the engine coolant contained therein. The power system 10 may also include a fuel injector for injecting fuel into the combustion chamber of the cylinders 19. The power system 10 may further include a crank angle sensor which measures the instantaneous position of the crankshaft and generates a crank angle signal necessary to time the opening and closing of the intake valve, opening and closing of the exhaust valve, and injection of fuel into the combustion chamber with respect to the position of the piston in the cylinder.

The ECM 120 is operable to receive, for example, temperature signals from the temperature sensor and crank angle signals from the crank angle sensor. The ECM 120 is further operable to generate fuel injector control signals which are sent to the fuel injector in response to receiving the temperature signal and crank angle position signal. The injector control signals control the timing and quantity of fuel injected by the fuel injector into the combustion chamber of the injectors. The ECM 120 is yet further operable to generate intake valve control signals and exhaust valve control signals in response to receiving the temperature signal and crank angle position signal. Intake valve control signals are sent to the intake valve actuators 39 so as to cause the intake valve actuators 39 to position the intake valves either open or closed.

Figure 5:
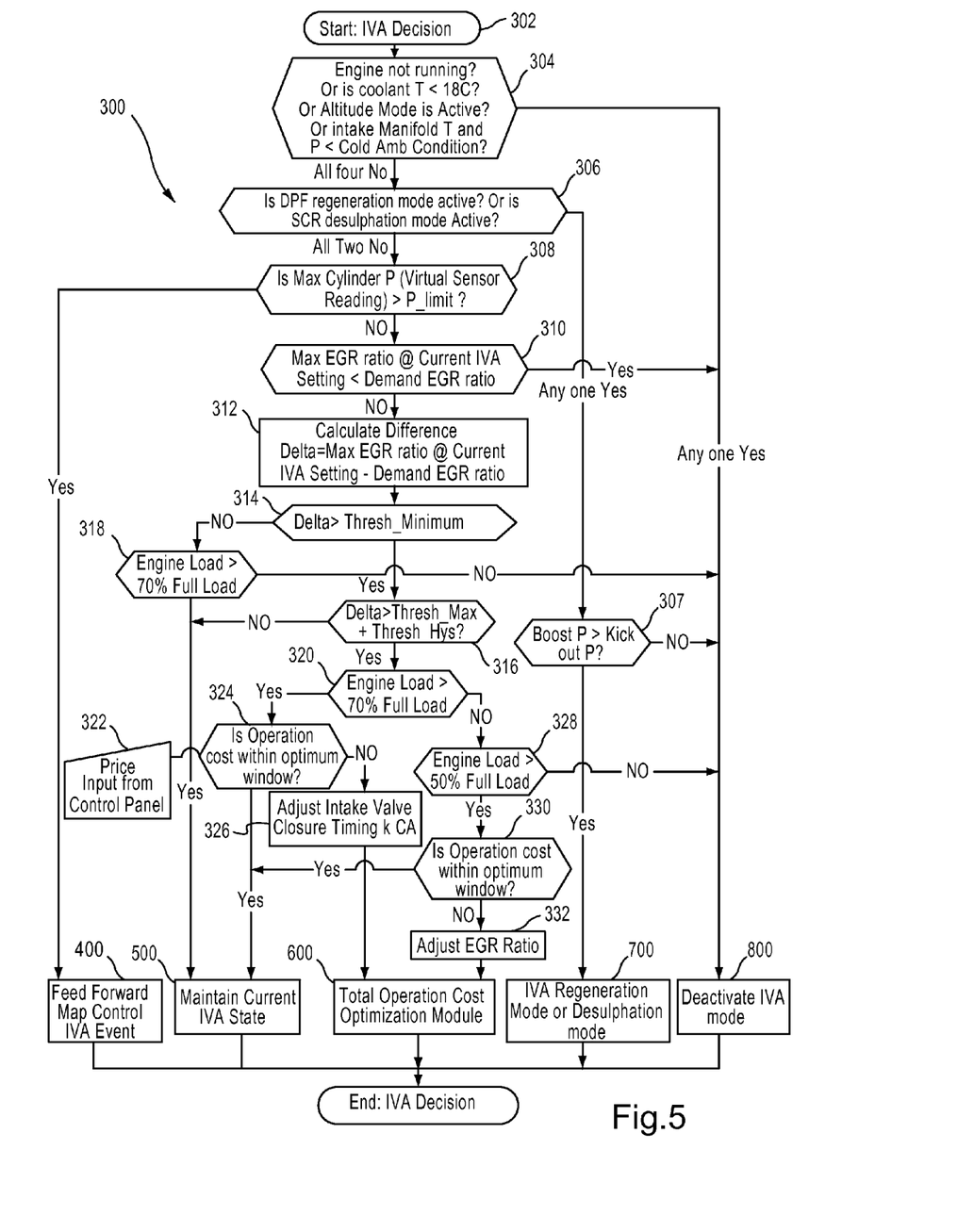
FIG. 5 is a flow chart illustrating an IVA process for determining an engine operating strategy, in accordance with aspects of the present disclosure.

The adaptive control method of the present disclosure includes first determining which discrete intake valve actuation (IVA) operating strategy is appropriate based on the current operating conditions of the power system 10. Referring now to FIG. 5, a flowchart or process 300, which may be software stored in the ECM 120, may be implemented according to an aspect of the disclosure to determine the operational mode (400, 500, 600, 700, 800). The ECM 120, being an adaptive coupled EGR and IVA controller, can adjust intake valve closure timing and exhaust recirculation rate to optimize an indicated thermal efficiency for the engine operation region. An IVA control module may adaptively adjust volumetric efficiency according to the flowchart illustrated in FIG. 5. Those skilled in the art can easily and readily develop the specific software code necessary to implement the flowchart or process 300 by using the specific instructions set associated with the microprocessor or microcontroller selected for use with the ECM 120 of the present disclosure.

The process 300 begins at a step 302 in which the method implemented by the ECM 120 starts or begins operation. The method continues to a step 304 in which it is determined whether 1) the engine is running; 2) the engine coolant temperature is less than a predetermined temperature, such as 18° Celsius; 3) an altitude mode is active (pressure and temperature impacts being different at varying altitudes); and 4) the intake manifold temperature and pressure indicate a condition less than a known cold ambient condition for the intake manifold. If the answer to any one of the four questions in step 304 is yes, a "cold-starting condition", or "high altitude condition", or "cold ambient white smoke condition" is identified respectively and operating mode 800 is automatically selected in which the IVA mode is either never started and/or is immediately deactivated until all of the conditions at step 304 are met. During the cold start-up condition, the fuel may not combust in the combustion chamber during a compression stroke. In addition, if the fuel partially combusts in the combustion chamber of the cylinder 19, the exhaust products produced during the combustion process may contain excessive unburned hydrocarbons or white smoke.

Alternatively, if all four of the criteria in 304 are met, i.e., the answers to all four questions are "no," a check is performed at step 306 to determine if the DPF 32 regeneration mode is active or the SCR desulphation mode is active. For example, the ECM 120 may actively monitor a pressure difference across the DPF and/or an SCR conversion efficiency. When a regeneration or desulphation event is triggered, ECM 120 will check if the boost pressure is greater than the kick out pressure at step 307 before the ECM 120 may direct the system to operating mode 700. The ECM 120 enables regeneration or SCR desulphation mode to actively control the exhaust temperature. In accordance with yet other aspects of the present disclosure, if the boost pressure is not greater than the kick out pressure, the ECM 120 may direct adopting operating mode 800 and deactivate the IVA mode.

If regeneration or SCR desulphation mode is not required, the process moves to step 308. The maximum cylinder pressure is determined and if the maximum cylinder pressure is greater than a predetermined pressure limit, the ECM 120 adopts operating mode 400. A feed forward map, which may have specific parameters predetermined and stored, is used to control the IVA event. However, if the maximum cylinder pressure is not greater than the predetermined pressure limit, the process proceeds to step 310 and a maximum EGR ratio for the current IVA settings is determined. If the EGR ratio determined in step 310 is less than a demand EGR ratio, then the ECM 120 adopts mode 800 and deactivates the IVA mode.

Otherwise the process proceeds to step 312 at which point the ECM 120 calculates the difference (delta) of the maximum EGR ratio at the current IVA settings against the demand EGR ratio. If the difference (delta) is greater than a predetermined threshold minimum, as determined at step 314, the ECM 120 continues to step 316. If the difference (delta) is not greater than the predetermined threshold minimum at step 314, an engine load check is performed at step 318, wherein if the engine load is greater than 70% of full load, the ECM adopts operating mode 500 and maintains the current IVA state. However, if the engine load is less than 70% full load, the ECM 120 adopts mode 800 and the IVA mode is deactivated.

Referring again to step 314, if the difference (delta) between the maximum EGR ratio at the current IVA settings and the demand EGR ratio is greater than the predetermined threshold minimum, a hysteresis check is performed at step 316 to see if the difference (delta) is greater than the threshold maximum plus a threshold hysteresis measurement. If not, the ECM adopts operating mode 500 and maintains the current IVA state. If the answer is "yes" at 316, the engine load is determined at step 320. If the engine load is determined to be greater than 70% of full load at step 320, price inputs such as fuel cost, reductant cost, etc. are provided at 322 to be used by the ECM 120 at step 324 to determine if the operating cost of the system is within an optimum window. Prices for diesel fuel and the reductant, such as Diesel Exhaust Fluid (DEF), may be input manually from a control panel (not shown) or automatically received over any one of multiple networks. For example, the price inputs may be automatically received at varying time frequencies, such as once per day or more frequently. Furthermore, the ECM 120 may include hardware and software for receiving the information in tandem with location information, such as location information provided via a Global Positioning Satellite (GPS) link, wherein not only the prices but such other information as varying emissions standards may change due to location within certain political or geographic boundaries. If the operating cost is within a predetermined optimum window, the ECM 120 adopts operating mode 500 and maintains the current IVA state. If it is determined at step 324 that the operating cost is not within the optimum window, the closure timing of the intake valves as controlled by the intake valve actuators 39 is adjusted as calculated by the total operation cost optimization module 600.

Referring again to step 320, if the engine load is less than 70% of full load, the ECM 120 determines if the engine load is greater than 50% of full load at step 328. If not, the IVA is deactivated per operating mode 800. However, if the engine load is greater than 50% but less than 70%, price inputs such as fuel cost, reductant cost, etc. are provided to be used by the ECM 120 at step 330 to determine if the operating cost of the system is within the optimum window. If the operating cost is within the optimum window, the ECM 120 adopts operating mode 500 and maintains the current IVA state. If it is determined at step 330 that the operating cost is not within the optimum window, the EGR ratio is adjusted as calculated by the Total Operation Cost Optimization Module 600.

Figure 6:
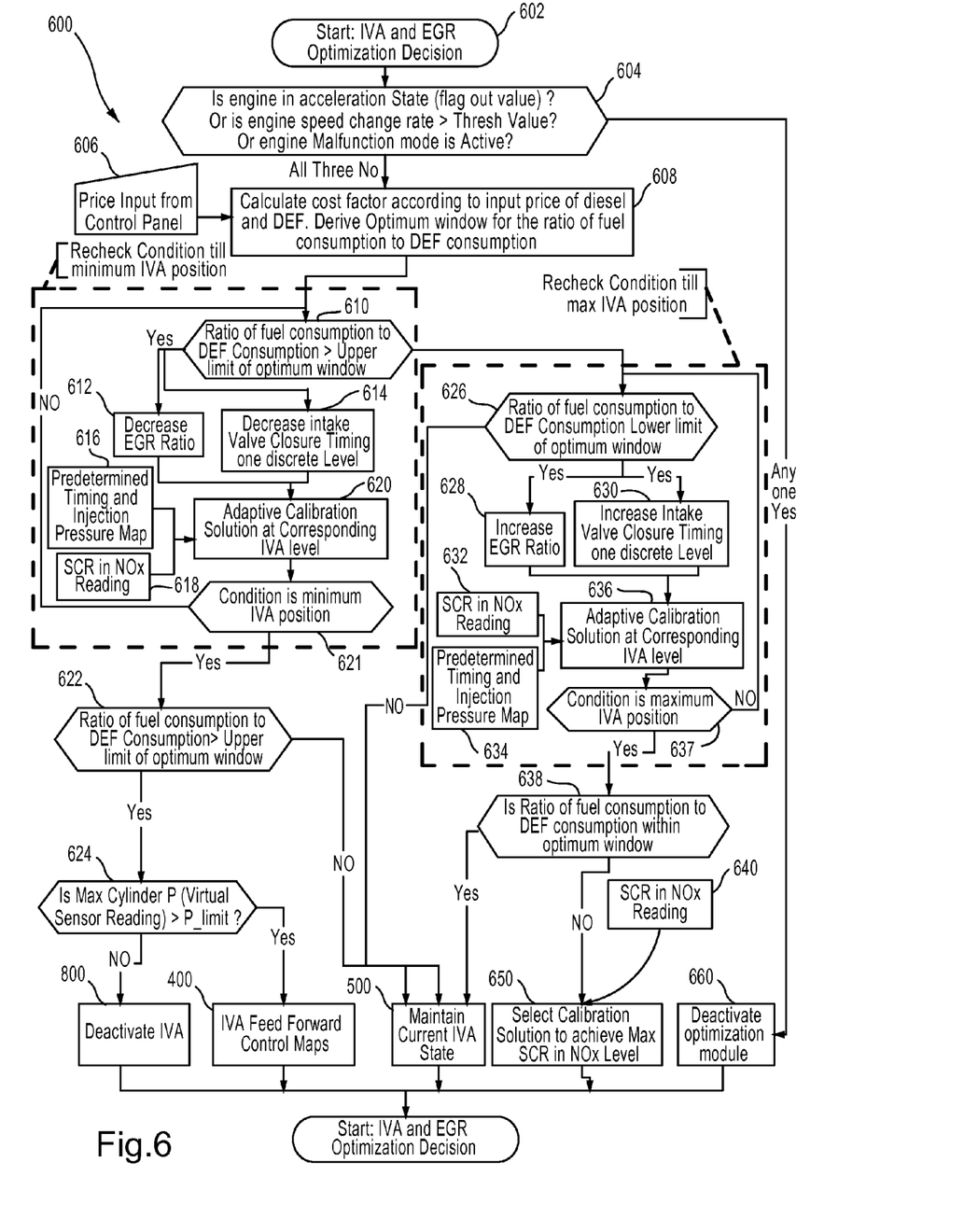
FIG. 6 is a flow chart illustrating an optimization process for calibration of the IVA and EGR systems, in accordance with aspects of the present disclosure.

FIG. 5 outlines the procedure performed by the ECM 120 to determine if actuation authority exists to even perform the economic balance calculated by the Total Operation Cost Optimization Module 600 illustrated in FIG. 6. If process 300 ends with the requirement for an optimization decision, the Optimization Module 600 is initiated, starting at step 602. The method continues to a step 604 in which it is determined whether 1) the engine is in an acceleration state; 2) the engine speed change rate is greater than a predetermined threshold value; or 3) an engine malfunction mode is active. If any one of the criteria above is affirmatively met, then the optimization module 600 is deactivated at step 660. However, if all three criteria do not apply, the system proceeds to step 608.

At step 606, prices for diesel fuel and the reductant, such as Diesel Exhaust Fluid (DEF), may be input manually from a control panel (not shown) or automatically received over any one of multiple networks. For example, the price inputs may be automatically received for varying time frequencies, such as once per day or more frequently. The ECM 120 may include hardware and software for receiving the information in tandem with location information, such as via a Global Positioning Satellite (GPS) link, wherein not only the prices but such other information as local emissions requirements may change due to location within certain political or geographic boundaries. The input prices from step 606 are used in step 608 and the cost of operating the engine is calculated based on the cost of the diesel fuel and the reductant as well as the engine operating parameters.

At this point, an optimum window for the ratio of fuel consumption to reductant consumption may be determined. Although certain exemplary values are used herein to illustrate the various concepts described below, it will be understood by one of ordinary skill in the art that these values may certainly vary depending on the inherent variability of any given power system.

At a certain operating condition (e.g., full load), the engine out BSNOx with zero EGR (the EGR valve fully closed) may be 3.7 g/KW-hr, for example. At the same condition, when the EGR valve is fully open (maximum EGR capability), the level may approach 2.41 g/KW-hr BSNOx, and thus the maximum reduction capability of the EGR system is 35%. Knowing that the conventional NOx conversion rate in a Urea-SCR system may be about 90%, for example, the SCR system may have a maximum 90% reduction capability. Thus, by making full use of the potential of both the EGR and the SCR systems, NOx emissions may be held to 0.24 g/KW-hr BSNOx in this scenario, which is the lowest emission value at the certain operating condition.

However, most diesel engines are calibrated to produce BSNOx that is closer to a development target (e.g., 0.36 g/KW-hr) instead of the lowest emission value to improve the Brake Specific Fuel Consumption (BSFC). Assuming that both the EGR and the SCR systems are linearly controlled systems, the following equation (1) can be used to calculate the tailpipe out BSNOx emission:

$$\text{Tailpipe Out NO}x = \text{Engine Out NO}x*(1-C1*35\%)*(1-C2*90\%) \quad (1)$$

C1=Utilized EGR Reduction Capacity (0: EGR Valve full close, 100%: EGR Valve full open)

C2=Utilized SCR Reduction Capacity (0: No DEF (reductant) injected and zero NOx conversion, 100%: Maximum DEF injected and Maximum NOx conversion rate)

If the result of equation (1), i.e. the Tailpipe Out NOx is set to equal a predetermined development target (e.g., 0.36 g/KW-hr), then the equation may be set up as shown below:

$$\text{Engine Out NO}x*(1-C1*35\%)*(1-C2*90\%)=0.36 \text{ g/KW-hr} \quad (2)$$

Equation (2) will lead to combinations of C1 and C2 for certain engine operating conditions. As shown below in Table A for an engine operating at full load, various scenarios (i.e., combinations of EGR and SCR operating conditions) may be derived to determine an optimum performance window that meets the legal emissions requirements by setting a development target that is below a legal limit.

TABLE A

Full Load EGR/SCR Combinations

| Scenarios | C1 | C2 | Tailpipe Out BSNOx Emission | Result |
|---|---|---|---|---|
| No EGR Max SCR | 0% | 100% | 0.37 | Above Dev Goal |
| Max EGR No SCR | 100% | 0% | 2.405 | Above Dev Goal |
| Max EGR Max SCR | 100% | 100% | 0.2405 | Below Dev Goal Over protected |
| Combination 1 | 10% | 99.9% | 0.36 | Hit Target |
| Combination 2 | 40% | 98.5% | 0.36 | Hit Target |
| Combination 3 | 60% | 97.4% | 0.36 | Hit Target |
| Combination 4 | 80% | 96.1% | 0.36 | Hit Target |
| Combination 5 | 100% | 94.5% | 0.36 | Hit Target |

The same calculations may be used to determine an optimization window based on a partial load condition. For example, it may be determined that the engine out BSNOx with zero EGR (the EGR valve fully closed) at partial load is 2.8 g/KW-hr, for example. At the same condition, when the EGR valve is fully open (maximum EGR capability), the level may approach 1.82 g/KW-hr BSNOx, the maximum reduction capability of the EGR system being 35%. Again, knowing that the conventional NOx conversion rate in a Urea-SCR system is 90%, by making full use of the potential of both the EGR and the SCR systems, NOx emissions may be held to 0.182 g/KW-hr BSNOx in this scenario. However, with a legal requirement of 0.4 g/KW-hr BSNOx, for example, the development target of 0.36 may once again be used to derive a table of EGR and SCR combinations as shown below in Table B.

TABLE B

Partial Load EGR/SCR Combinations

| Scenarios | C1 | C2 | Tailpipe Out BSNOx Emission | Result |
|---|---|---|---|---|
| No EGR Max SCR | 0% | 100% | 0.28 | Over protected |
| Max EGR No SCR | 100% | 0% | 1.82 | Above Dev Goal |
| Max EGR Max SCR | 100% | 100% | 0.182 | Below Dev Goal Over protected |
| Combination 1 | 10% | 96.3% | 0.36 | Hit Target |
| Combination 2 | 20% | 95.8% | 0.36 | Hit Target |
| Combination 3 | 50% | 93.8% | 0.36 | Hit Target |
| Combination 4 | 90% | 90.3% | 0.36 | Hit Target |
| Combination 5 | 100% | 89.1% | 0.36 | Hit Target |

The fuel consumption and reductant (DEF) consumption at each corresponding C1 and C2 may be determined during a calibration process or estimated by regression equations. Given the manufacturing variation in diesel engines, the engines may be preferably calibrated by using intermediate C1 and C2 combinations. For example, Combinations 2-4 in Tables A and B may provide a good calibration window for both full load and part load operating conditions. The linear control assumption holds for this region, wherein non-linearity might occur at extreme calibration conditions. This calibration window may be defined as the Hardware Optimum Window. However, the Hardware Optimum Window does not take into consideration the price of fuel and the reductant.

The Optimum Calibration Window for the ratio of fuel consumption to reductant consumption may then be determined as illustrated in the example below. For example, the unit price of fuel may be compared to a default diesel fuel price to determine a Fuel Price Factor, wherein the Fuel Price Factor=P_diesel/P_Default_1. Next the unit price of reductant (e.g., DEF) may be compared to a default reductant price to determine a reductant price factor, wherein DEF Price Factor=P_DEF/P_Default_2. Thus, the Optimum Calibration Window at a certain operating condition may be determined as shown below:

$$\text{Optimum Calibration Window} = \text{Hardware Optimum Window} \times \frac{DEF \text{ Price Factor}}{Fuel \text{ Price Factor}}$$

such that the $$\text{Upper Limit @ Optimum Calibration Window} = \left(\frac{\text{Fuel Rate}}{DEF \text{ Rate}}\right)\bigg|_{\text{Maximum value @ Hardware Optimum Window}} \times \frac{DEF \text{ Price Factor}}{Fuel \text{ Price Factor}}$$

$$\text{Lower Limit @ Optimum Calibration Window} = \left(\frac{\text{Fuel Rate}}{DEF \text{ Rate}}\right)\bigg|_{\text{Maximum value @ Hardware Optimum Window}} \times \frac{DEF \text{ Price Factor}}{Fuel \text{ Price Factor}}$$

As illustrated above, the specific values determined may be directly associated with a specific engine operating condition. Any final value will not exceed the hardware capability, wherein the extreme conditions (zero EGR or zero SCR) actually set ceilings for the final values. These values are stored in the calibration maps in the engine ECM.

Referring again to FIG. 6, once the Optimum Calibration Window parameters are determined as described above, at step 610 the ECM 120 determines whether the ratio of fuel consumption to DEF consumption is greater than the upper limit of the Optimum Calibration Window. If the ratio is greater, the EGR rate is decreased at 612 and the intake valve closure timing is decreased one discrete level at 614. Valve closure timing may be implemented by any suitable means, including via rotation of the camshaft, electromechanical or hydraulic actuation, or stepped motors, for example.

At step 620, an adaptive calibration solution is derived for the newly determined valve timing that relies on retrieving at step 616 predetermined timing and injection pressure data stored in a map downloaded to or maintained by the ECM 120. In addition, a reading of the reduction in NOx as a result of the SCR system being employed at the recommended ratio for the calibrated setting is provided at step 618 to the adaptive calibration solution determined at step 620. With the new parameters thus having been determined and applied via the ECM 120, the ECM 120 performs a check at step 621 to determine whether the current operating condition is indicative of a minimum IVA position (e.g., the reduction in intake valve closure timing by the IVA system is at a minimum). As shown in FIG. 6, a reiterative loop of steps 610 through 621 may be performed until the minimum IVA position is indicated. Once the minimum IVA position is indicated, the ratio of fuel consumption to DEF consumption is again determined at step 622 and compared to the upper limit of the Optimum Calibration Window. If the ratio is not greater than the upper limit of the Optimum Calibration Window, the ECM adopts mode 500 and maintains the current IVA state. However, if the ratio is still greater than the upper limit of the Optimum Calibration Window, a cylinder pressure check is performed at step 624. If the maximum cylinder pressure, which may be determined via a virtual sensor determination, for example, is greater than a predetermined pressure limit for the cylinder, the ECM 120 adopts operating mode 400. The IVA feed forward control maps, which may have specific parameters predetermined and stored, are used to control the IVA event. However, if the maximum cylinder pressure is not greater than the predetermined pressure limit, then the ECM 120 adopts mode 800 and deactivates the IVA mode.

Referring back to step 610, if the ratio of fuel consumption to DEF consumption at step 610 is not greater than the upper limit of the Optimum Calibration Window, a check is performed by the ECM 120 at step 626 to determine if the ratio is less than the lower limit of the Optimum Calibration Window. If the ratio is not less than the lower limit of the Optimum Calibration Window, the ECM 120 adopts mode 500 and maintains the current IVA state. However, if the ratio is less than the lower limit of the Optimum Calibration Window, the EGR rate is increased at 628 and the intake valve closure timing is increased one discrete level at 630.

At step 636, an adaptive calibration solution is derived for the newly determined valve timing that relies on retrieving at step 634 predetermined timing and injection pressure data stored in a map downloaded to or maintained by the ECM 120. In addition, a reading of the reduction in NOx is retrieved at step 632 as a result of the SCR system being employed at the recommended ratio for the calibrated setting and is used in the adaptive calibration solution determined at step 636. With the new parameters having thus been determined and applied via the ECM 120, the ECM 120 performs a check at step 637 to determine whether the current operating condition is indicative of a maximum IVA position (e.g., the increase in intake valve closure timing by the IVA system is at a maximum). As shown in FIG. 6, a reiterative loop of steps 626 through 637 may be performed until the maximum IVA position is indicated. Once the maximum IVA position is indicated, another determination is made at step 638 regarding whether the ratio of fuel consumption to DEF consumption is now within the Optimum Calibration Window. If the ratio is within the Optimum Calibration Window, the ECM adopts mode 500 and maintains the current IVA state. However, if the ratio is not within the Optimum Calibration Window at step 638, the ECM 120 adopts operating mode 650. At step 640, a reading of the reduction of the NOx as a result of the SCR system is made and feeds operating mode 650 to select a calibration solution to achieve the maximum reduction of NOx ratio that can be employed using the SCR system.

Thus as can be seen by the dashed lines in FIG. 6, the optimization module adjusts the EGR and IVA operating points based on the relative costs of fuel and reductant. Once adjusted, the choice of IVA operating modes is reevaluated and selected based on whether the ratio of fuel consumption to reductant (DEF) consumption is within a predetermined Optimum Calibration Window. The result is an efficient method for optimizing the effects of IVA and EGR to promote component life, meet emissions requirements, and minimize the sum of fuel cost and reductant (DEF) cost used in the SCR system. By selecting discrete WA and EGR operating modes based on an engine operating condition, tradeoffs may be evaluated between in-cylinder and aftertreatment emissions control strategies to minimize the total cost of fuel and reductant (DEF). The coupled EGR and IVA controller can adaptively adjust EGR rate and intake valve closure timing to minimize total operation cost. The ECM can also deactivate the IVA event at high altitude operation mode, cold start mode, cold ambient white smoke mode. The ECM runs the optimization process at normal operation mode with input of onboard NOx sensor readings and the prices for fuel and DEF. The ECM can also suspend the optimization process during engine acceleration mode and fast transient mode.

Figure 7:
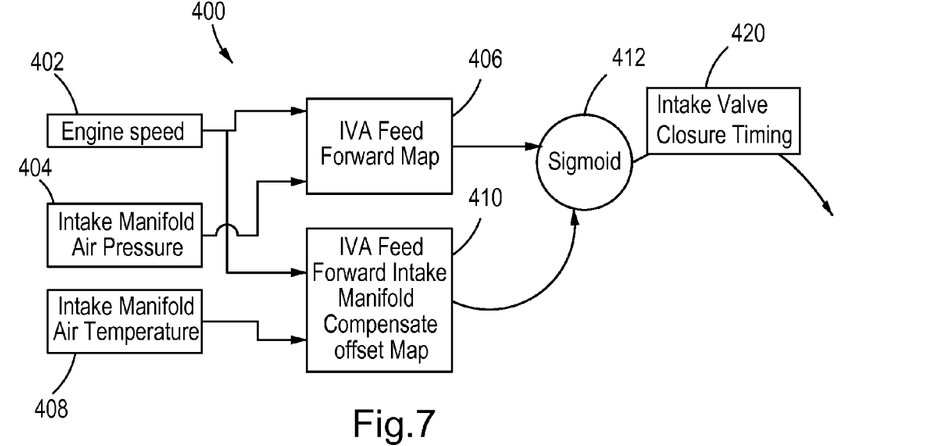
FIG. 7 is a flow chart illustrating an IVA feed forward process, in accordance with aspects of the present disclosure.

With respect to the IVA Feed Forward Control Maps, FIG. 7 illustrates the process and variables used to determine the intake valve closure timing when the ECM selects mode 400. For example, the engine speed 402 and intake manifold air pressure 404 are used to find predetermined settings from an IVA Feed Forward Map 406, which may be stored by the ECM 120, for example, for determining the intake valve closure timing for the WA system. However, the engine speed 402 and intake manifold air temperature 408 may also be considered in tandem to find a predetermined compensation value from an IVA Feed Forward Intake Manifold Compensation Offset Map 410. At step 412, a non-linear algorithm may apply the offset value determined using the map 410 to the intake valve closure timing settings determined using the Feed Forward Map 406. The ECM 120 may then control the variable valve actuators 39 for each cylinder 19 by applying the compensated final intake valve closure timing settings that are the output 420 of mode 400.

As noted supra, the engine ECM 120 may also actively monitor the SCR conversion efficiency and pressure differential across the DPF. Thus, whenever a regeneration event or desulphation event is triggered, the coupled EGR and IVA controller will enable the IVA Regeneration or Desulphation mode 700 to actively control the exhaust temperature.

Figure 8:
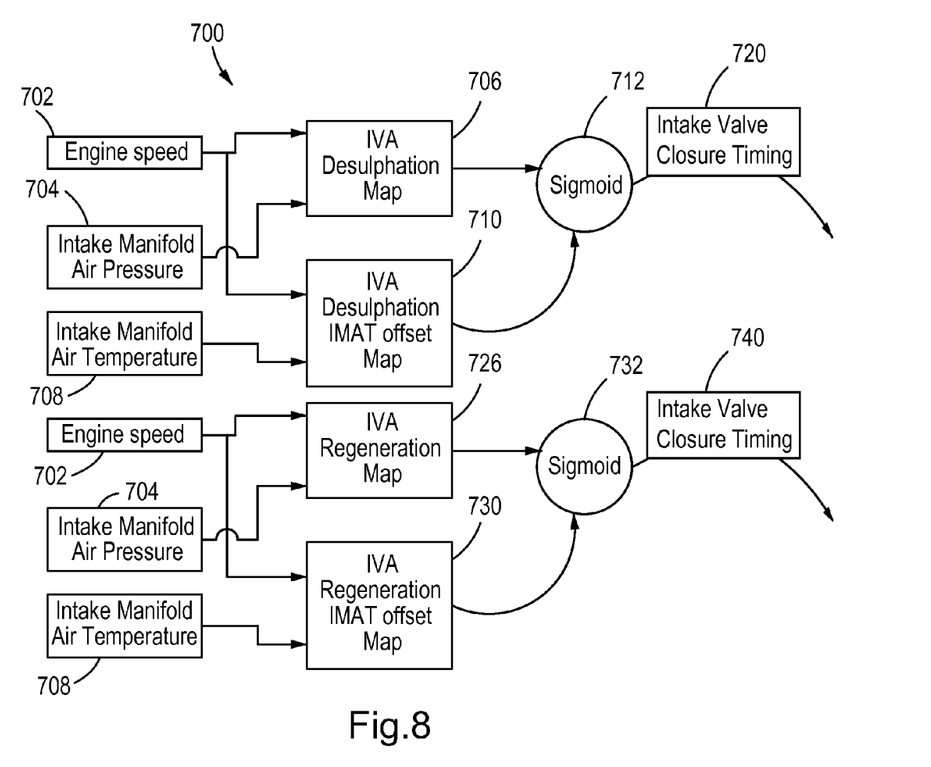
FIG. 8 is a flow chart illustrating an IVA thermal event process for SCR system desulphation and EGR system regeneration, in accordance with aspects of the present disclosure.

For example, as shown in FIG. 8 with respect to the desulphation mode, the engine speed 702 and intake manifold air pressure 704 are used to find predetermined settings from an IVA Desulphation Map 706, which may be stored by the ECM 120, for determining the intake valve closure timing for the IVA system. However, the engine speed 702 and intake manifold air temperature (IMAT) 708 may also be considered in tandem to find a predetermined compensation value from an IVA Desulphation IMAT Offset Map 710. At step 712, a non-linear algorithm may apply the offset value determined using the map 710 to the intake valve closure timing settings determined using the Desulphation Map 706. The ECM 120 may then control the variable valve actuators 39 for each cylinder 19 based on the compensated final intake valve closure timing settings that are the output 720.

The process may be repeated with respect to the DPF system. As also shown in FIG. 8, the engine speed 702 and intake manifold air pressure 704 are used to find predetermined settings from an IVA Regeneration Map 726, which may be stored by the ECM 120, for determining the intake valve closure timing for the IVA system. However, the engine speed 702 and intake manifold air temperature (IMAT) 708 may also be considered in tandem to find a predetermined compensation value from an IVA Regeneration IMAT Offset Map 730. At step 732, a non-linear algorithm may apply the offset value determined using the map 730 to the intake valve closure timing settings determined using the Regeneration Map 726. The ECM 120 may then control the variable valve actuators 39 for each cylinder 19 based on the compensated final intake valve closure timing settings that are the output 740.

INDUSTRIAL APPLICABILITY

The disclosure includes a system and methods for optimizing the effects of Intake Valve Actuation (IVA) and Exhaust Gas Recirculation (EGR) to promote component life, meet emissions requirements, and maximize cost efficiency of engine operations taking into consideration the sum of fuel cost as well as reductant cost used in a Selective Catalytic Reduction (SCR) system. EGR control in most commercial available diesel engines is based on feedback control, while IVA control in conventional engines is based on calibration maps and feed forward control. Decoupling the control logic of IVA from that of the EGR system during feed forward, desulphation and regeneration modes, while optimizing the control logic of IVA with EGR control during normal engine operating modes, minimizes the total operational cost of an engine by taking into consideration the price information for both the reductant as well as the price of fuel.

The methods and systems disclosed are for use on platforms incorporating an internal combustion engine, including large industrial equipment that relies on a diesel engine as the primary mover.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

We claim:

1. A power system, comprising:
   an internal combustion engine having a plurality of combustion cylinders and a plurality of corresponding intake valves for controlling a flow of air from an air intake into the cylinders;
   an exhaust gas recirculation system configured to recirculate a portion of an exhaust gas flow exiting the cylinders back into the air intake;
   a selective catalytic reduction system configured to inject a reductant into the exhaust gas flow;
   a variable valve actuation system having a plurality of valve actuators for variably controlling a closure timing of the intake valves; and
   an engine control module configured to adjust the closure timing of the intake valves based on at least one engine parameter and optimization of an operational cost of the power system;
   wherein the engine control module maintains a current closure timing of the intake valves when a ratio of a fuel consumption to a reductant consumption is maintained within an optimum window dictated by a NOx emission requirement.

2. The system of claim 1, wherein the internal combustion engine is a diesel engine.

3. The system of claim 1, wherein the at least one engine parameter includes a load of the internal combustion engine.

4. The system of claim 1, wherein the reductant is urea.

5. The system of claim 1, wherein the operational cost of the system is based on a relative cost of fuel for the internal combustion engine and a cost of the reductant used in the selective catalytic reduction system.

6. The system of claim 5, wherein the cost of fuel and the cost of the reductant are provided to the engine control module through a manual input device.

7. The system of claim 5, wherein the cost of fuel and the cost of the reductant are provided to the engine control module through an automated network.

8. The system of claim 5, wherein the operational cost of the system is further determined based on the fuel consumption and the reductant consumption for an engine loading condition.

9. The system of claim 8, wherein the fuel consumption and the reductant consumption are controlled based on a NOx reduction capability of the exhaust gas recirculation system and a NOx reduction capability of the selective catalytic reduction system.

10. A method for controlling a power system, the power system including an internal combustion engine configured to generate power through combustion of a fuel, the internal combustion engine including intake valves to selectively effect fluid communication between an air intake and a combustion chamber, the method comprising:
    recirculating a portion of an exhaust flow from the internal combustion engine to the air intake using an exhaust gas recirculation system;
    injecting a reductant into the exhaust flow using a selective catalytic reduction system;
    adjusting a closure timing of the intake valves based on at least one engine parameter and optimization of an operational cost of the power system; and
    controlling, with an engine control module, a fuel consumption and a reductant consumption based on a NOx reduction capability of the exhaust gas recirculation system and a NOx reduction capability of the selective catalytic reduction system;
    wherein the engine control module maintains a current closure timing of the intake valves when a ratio of the fuel consumption to the reductant consumption is maintained within an optimum window dictated by a NOx emission requirement.

11. The method of claim 10, wherein the internal combustion engine is a diesel engine.

12. The method of claim 10, further comprising:
    variably controlling the closure timing of the intake valves with a plurality of valve actuators.

13. The method of claim 10, wherein the at least one engine parameter includes a load of the internal combustion engine.

14. The method of claim 10, further comprising:
    determining the operational cost of the power system based on a relative cost of the fuel for the internal combustion engine and a cost of the reductant used in the selective catalytic reduction system.

15. The method of claim 14, wherein the power system further comprises an engine control module, the method further comprising:
    manually inputting the cost of the fuel and the cost of the reductant to the engine control module through a manual input device.

16. The method of claim 14, further comprising:
    obtaining the cost of fuel and the cost of the reductant for the engine control module through an automated network.

* * * * *